(12) United States Patent
Hiisilä et al.

(10) Patent No.: US 10,571,906 B2
(45) Date of Patent: Feb. 25, 2020

(54) METHOD FOR REPLACING A SIGNAL CONTROLLING AN ACTUATOR IN A REMOTE-CONTROLLED FLYING DEVICE WITH ANOTHER SIGNAL

(71) Applicant: SkyCat Oy, Forssa (FI)

(72) Inventors: Henri Hiisilä, Forssa (FI); Janne Laurinen, Forssa (FI)

(73) Assignee: SkyCat Oy, Forssa (FI)

( * ) Notice: Subject to any disclaimer, the term of this patent is extended or adjusted under 35 U.S.C. 154(b) by 40 days.

(21) Appl. No.: 15/698,303

(22) Filed: Sep. 7, 2017

(65) Prior Publication Data
US 2017/0371332 A1     Dec. 28, 2017

Related U.S. Application Data

(63) Continuation of application No. PCT/FI2016/000005, filed on Mar. 7, 2016.

(30) Foreign Application Priority Data

Mar. 12, 2015   (FI) ..................................... 20150071

(51) Int. Cl.
*G05D 1/00*       (2006.01)
*A63H 30/04*      (2006.01)
(Continued)

(52) U.S. Cl.
CPC ............ *G05D 1/0022* (2013.01); *A63H 30/04* (2013.01); *A63H 33/20* (2013.01); *B64C 19/00* (2013.01);
(Continued)

(58) Field of Classification Search
CPC ........ A63H 30/04; A63H 33/20; B64C 19/00; B64C 39/02; B64C 39/024; B64D 17/80; B64D 27/04; G05D 1/0055; G08C 17/02
(Continued)

(56) References Cited

U.S. PATENT DOCUMENTS 4,206,411 A      6/1980  Meyer
2001/0048050 A1*  12/2001  Grieser .................. B64D 17/80
                                                  244/152
2003/0057327 A1   3/2003  Carroll

FOREIGN PATENT DOCUMENTS

EP      2781980 A1    9/2014
WO      0204289 A1    1/2002
(Continued)

OTHER PUBLICATIONS

International search report, dated May 13, 2016 issued by Finnish Patent Office.

*Primary Examiner* — Maceeh Anwari
(74) *Attorney, Agent, or Firm* — Berggren LLP

(57) ABSTRACT

The present invention relates to a method for replacing a signal controlling an actuator in a remote-controlled flying device with another signal. A flight controller supplies control signals to a safety device, and the signal to be replaced may be a signal to be transmitted by the safety device to a speed controller of at least one motor, or to a servo unit controlling the same, or the signal to be replaced may be a signal to be transmitted from the safety device to a servo unit controlling legs, a camera rack, a camera, a stabilizing system or an electric motor of the flying device. A replacement signal is a signal stored in a memory of the safety device. The replacement signal may be capable of controlling the speed controller directly or via the servo unit, in such a way that power transmission to said motor/motors is stopped or reduced, and this motor is/these motors are switched off or its/their rotation is decelerated, or the replacement signal may be capable of controlling said servo unit in such a way that said actuator is moved to a second position. The replacement signal may be a signal to be transmitted from a receiver past a flight controller, capable of controlling the speed controller or servo unit of the motor (Continued)

in such a way that power transmission to the motor is stopped or reduced, or to control said actuator in such a way that this actuator is moved to another position.

12 Claims, 2 Drawing Sheets

(51) Int. Cl.
    *A63H 33/20*     (2006.01)
    *G08C 17/02*     (2006.01)
    *B64C 19/00*     (2006.01)
    *B64C 39/02*     (2006.01)
    *B64D 17/80*     (2006.01)

(52) U.S. Cl.
    CPC ......... *B64C 39/024* (2013.01); *G05D 1/0055* (2013.01); *G08C 17/02* (2013.01); *B64C 2201/141* (2013.01); *B64C 2201/146* (2013.01); *B64C 2201/185* (2013.01); *B64D 17/80* (2013.01)

(58) Field of Classification Search
    USPC .......................................................... 701/2
    See application file for complete search history.

(56) References Cited

FOREIGN PATENT DOCUMENTS

| | | |
|---|---|---|
| WO | 2014080409 A1 | 5/2014 |
| WO | 2015199567 A1 | 12/2014 |

* cited by examiner

METHOD FOR REPLACING A SIGNAL CONTROLLING AN ACTUATOR IN A REMOTE-CONTROLLED FLYING DEVICE WITH ANOTHER SIGNAL

PRIORITY CLAIM

This application is continuation application of international application PCT/FI2016/000005 filed on Mar. 7, 2016 and claiming priority of Finnish national application FI20150071 filed on Mar. 12, 2015, the contents of both of which are incorporated herein by reference.

FIELD AND BACKGROUND

The present invention relates to a method for replacing a signal controlling an actuator in a remote-controlled flying device with another signal. Said actuator may be a motor, a stabilizing system, a camera rack, a camera as such, the legs of the device, or another radio controlled actuator.

Uses of the invention include, for example, miniature helicopters, multicopters and airplanes. As it is well known, the above mentioned actuators of these devices are radio controlled in such a way that their power, position, and other functions may be adjusted by remote control. For example, the power to be input in an electric motor may be controlled by transmitting a signal at a given wavelength from a radio transmitter over a given channel to the receiver of the flying device, which forwards it to a flight control device, such as e.g. a computer, from which it is transferred by a pulse width modulation technique, a bus technique, or another known technique to an electronic speed controller controlling the motor, or to a servo unit controlling a mechanical speed controller, and the speed controller adjusts the power to be supplied by a power source, such as e.g. an accumulator or a battery, to the motor, to a given level corresponding to a given signal.

In a fault situation, it may be necessary to deploy the parachute of the flying device to avoid a danger being caused by the device when falling onto the ground, and in connection with deploying the parachute, the motor(s) of the device also have to be switched off for safety reasons. One application of the invention relates to this particular situation.

When for example a multicopter is placed in such a situation, it is common practice to switch off the motors of the rotors after deploying the parachute, by transmitting a radio signal from the ground to modify the signal in such a way that the speed controllers stop the power supply to the motors. It is known that the parachute may be deployed either by remote control or automatically by a control unit for the parachute in the device. In the latter case, the deploying may be based on the use of e.g. an acceleration sensor, a position transmitter, or a pressure-sensitive gauge.

This known technology has the disadvantage that there is often a delay between the deployment of the parachute and the switching off of the motors. Particularly when the parachute is automatically deployed by the control unit, this delay is unavoidable. This delay, in turn, may cause further problems, for example in such a way that uncontrolled movements of the device result in the destruction of the parachute if it comes into contact with the rotor blades.

Other actuators mentioned further above, such as the camera rack, the camera itself, or the legs of the device, are controlled, according to the prior art, in such a way that for changing their position, a radio signal corresponding to this change is transmitted by a remote controller, transferred from the receiver via the flight control device to the servo unit controlling the actuator by a known signalling technique (e.g. PWM, PPM) or by a bus technique.

It is known that all the channels of the radio controller are constantly updated during the operation of the flying device, and a signal is then constantly provided for the actuators. For a given period of time, the signal may also be constant, whereby e.g. the power of the motor remains constant for that time. The pulse length of the PWM signal may typically vary, for example, between 1.0 and 2.0 ms, whereby when the motor is running at half capacity, a signal with a constant pulse length of 1.5 ms is input in the speed controller. In a corresponding way, the servo units for the actuators may be set to operate in such a way that the signal pulse lengths corresponding to their extreme values are 1.0 ms and 2.0 ms when operating in said pulse length range.

The most serious drawback of this technique of prior art is the fact that position changes of the actuators are dependent on the reactions of the user of the flying device, whereby e.g. the turning of the legs of the device to the landing position may be delayed in an abnormal situation.

SUMMARY

It is an aim of the present invention to provide a method for replacing the signal controlling an actuator in a remote controlled flying device with another signal to avoid drawbacks present in the prior art. The solution according to the invention is characterized in what will be presented in the characterizing parts of the claims 1 to 3.

The greatest advantage of the invention may be considered to be the fact that the control of said actuators in certain fault situations and phases of the flight is not dependent on the reactions of the operator of the flying device and the measures taken by him/her, but the system will carry them out automatically, whereby problems due to the operator's reaction time are avoided.

Another advantage is achieved in that the settings of the radio controller may be simplified in such a way that a separate alternative signal (e.g. a signal for switching off the motor) does not need to be defined in its settings.

The (forced) signal replacement according to the invention is also very useful in a situation in which the flight controller has lost its ability to control and emits poor or even false control signals. This may happen, for example, as a result of a program error or a sensor failure. Another situation of signal replacement may be one in which the operator is no longer capable of controlling the flying device and gives poor control commands by the radio controller. The operator may then use, for example, the deployment of the parachute as a so-called panic button when he/she no longer knows what else to do. The reason for the signal replacement may also be any device failure.

In this document, the term "motor" refers to the electric motor rotating the airscrew or the rotor of the flying device. Other terms are used for other motors.

DESCRIPTION OF THE DRAWINGS

The invention will be described in more detail with reference to the appended drawings, in which.

DETAILED DESCRIPTION

In the following, the structure and the operation of an advantageous embodiment of the invention will be described with reference to the above mentioned figures.

Figure 1:
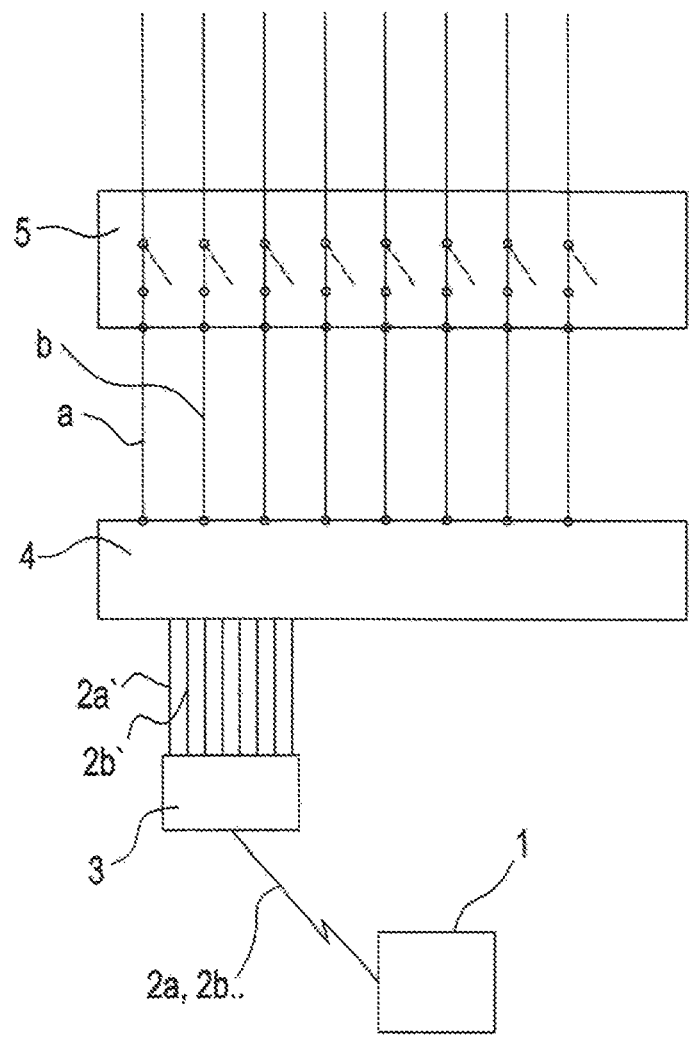
FIG. 1 shows schematically a signal processing system according to the invention.
Figure 2:
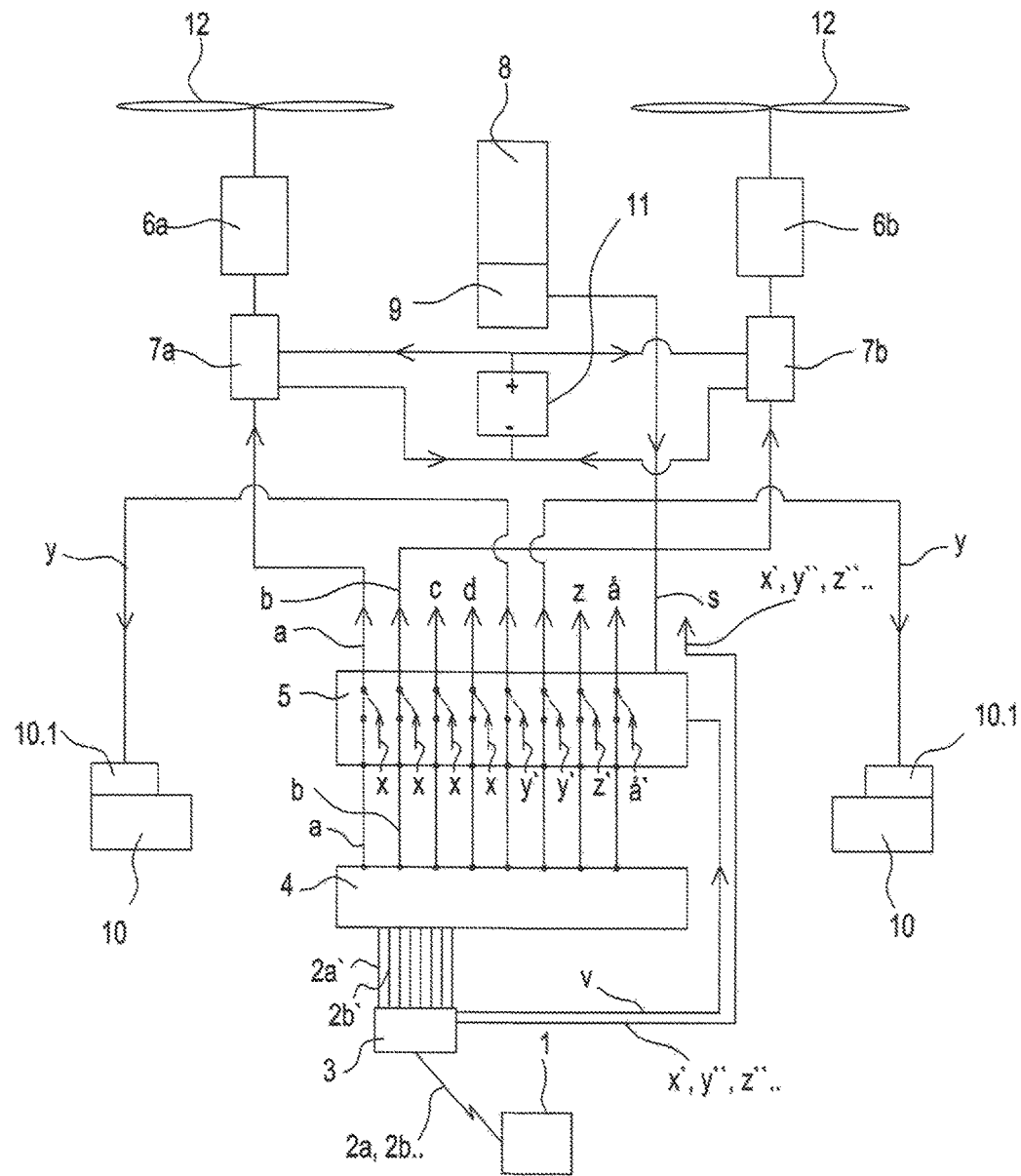
FIG. 2 shows schematically a remote control system for a remote controlled flying device according to the invention.

FIG. 1 outlines the principles of the invention. Radio signals 2a, 2b etc. transmitted from a transmitter 1 are received by a receiver 3 in a flying device, from which commands 2a', 2b' etc. corresponding to these signals are transmitted to a flight controller 4. Said commands are transmitted as control signals a, b etc. from the flight controller to a safety device 5. In a normal situation, the safety device passes these control signals further to the actuators, such as motors, legs of the device, a camera rack, a camera, etc. In the method according to the invention, replacement signals are stored in the memory of the safety device 5 during start-up of the device, and in a fault or danger situation, the control signals a, b, etc. are replaced according to the following example:

FIG. 2 shows a schematic and more extensive view of a remote control system for a flying four-rotor multicopter, applying the method according to the invention. Consequently, radio signals 2a, 2b, etc. are transmitted at specific frequencies and on specific channels from the transmitter 1 to the receiver 3 in the flying device. Commands 2a', 2b', etc. corresponding to these signals are transferred from the receiver 3 to the flight controller 4 which is, for example, a computer or an autopilot. The flight controller 4 supplies the signals as control signals a, b, etc. processed according to their programmed algorithms to the safety device 5. In the case of the normal operation of e.g. motors 6a to 6d for rotating rotors 12, the safety device 5 allows the control signals a-d to propagate to the electronic speed controllers 7a to 7d of these motors (two motors and their speed controllers are not shown in the figure). In this example, the speed controllers apply pulse width modulation (PWM) for determining the amount of power to be supplied from the power source 11 to the motors 6, and as a result of the rotation of the rotors 12 and other flight control measures, the multicopter flies along a specific route or remains in place at a given location in the air. Consequently, at the stage of configuring the settings, before the flight of the device, a replacement signal x, which is the signal for switching off the motors, has been stored in the memory of the safety device 5 of the multicopter, and in the event of a fault situation when the multicopter e.g. hits an obstacle, an acceleration sensor for a control unit 9 of a parachute 8 will provide information about exceeding a given acceleration value (in this case a negative value), whereby the control unit 9 for the parachute, which may be a separate unit, a part of the safety device 5, or a sensor controlling the deployment of the parachute, transmits a deployment signal to the parachute 8, and the parachute is deployed. In this document, all the devices for controlling the operation of said parachute are referred to by the general term control unit 9. In this example, the separate control unit 9 transmits a signal s about the deployment to the safety device 5 substantially at the moment of deployment of the parachute, whereby the safety device 5 ceases to pass control signals a-d to the speed controllers 7a-7d, and starts to transmit a replacement signal x, i.e. the signal for switching off the motors, to them by switching them to the outputs of the signals a, b, etc. to be replaced. Thus, the signal s demonstrating the deployment of the parachute may also be replaced by internal communication within the safety device 5 when said control unit is integrated in the safety device. In other words, the transmission of the signal determining the power supply to each motor is prevented at that very moment, and the transmission of the replacement signal for stopping the motor is started simultaneously and automatically.

Instead of totally replacing the above mentioned signal to be replaced, transmitting power to the motor, it is also possible to allow low power supply to the motor or motors 6 e.g. after the deployment of the parachute, whereby the method according to the invention is also implemented in this solution in which the rotation of the rotors is, however, substantially decelerated.

The invention may also be applied in such a way that upon stopping the motors 6 or substantially reducing their power, the position of the rotors 12 is locked to be immobile or moving very slowly, preventing their uncontrolled rotation during the falling movement, or on the other hand, they are brought to a position decelerating the fall.

The invention is also implemented when the speed controller 7, contrary to the above example, controls the operation of more than one motor 6. By inputting a given signal to such a speed controller, more than one motor can be operated in a desired way.

The invention may also be applied in such a way that the above mentioned signal for deployment of the parachute is given from the radio transmitter directly to said separate control unit 9 or the safety device 5 either simultaneously or separately with the flight controller 4. This signal may be transmitted by any radio transmitter connected to the system, by a user authorized to transmit it. An example of such a user is the police authority.

Each rotor 12 may be equipped with a separate motor, whereby the powers of these motors may be adjusted by several signals. It is also possible to apply a single-motor structure, whereby power transmission devices are provided between the motor and the rotors, for transmitting different powers to the rotors. Power transmission devices may also be used between a rotor-specific motor and the rotor. Nevertheless, it is possible to stop even several motors by supplying the same signal x to all the motors.

Another embodiment of the invention is to replace a signal y keeping the legs of the flying device in the flight position by such a replacement signal y' stored in the memory of the safety device 5 that makes the servo unit 10.1 controlling the legs 10 turn in a given way, whereby a mechanism connected to the servo unit turns the legs 10 to a landing position. If desired, this embodiment may be combined with e.g. the deployment of the parachute 8, whereby the signal s demonstrating the deployment to the safety device 5 from the control unit 9 of the parachute also activates the safety device 5 to stop the transmission of the signal y to the servo unit of the legs 10 and to start the transmission of the replacement signal y'. For changing the position of the legs, the invention may also be applied in such a way that the closing and opening of the legs is associated with a given value indicated by the altimeter, whereby the legs are automatically closed at a given ascending height and opened at a given descending height. Thus, the signal from the altimeter to the safety device 5 makes the safety device replace the signal y to be transmitted to the legs 10 with a different, replacing signal y'.

Similarly, the control of the camera in the flying device may be implemented by replacing the signal to be transmitted to the servo unit of the camera rack or of the release of the camera at a given moment with another signal inducing a given movement.

The speed controller used may be mechanical as well, whereby its operation is controlled by a servo unit, and the operation of this servo unit is controlled by signals transmitted by the safety device 5.

Instead of the above mentioned PWM technique, it is also possible to apply a bus technique, PPM technique, or any signal transmission technique in the method according to the invention. It is essential in the invention that the signal to be transmitted to any actuator of any flying device may be replaced at a given moment by another signal stored in the memory of the safety device 5 of said flying device or transmitted past the safety device.

The actuator may be any radio controllable actuator of the flying device. The actuator to be controlled may be, for example, the legs, the camera rack, the camera, the stabilizing system, or an electric motor of the flying device.

The need for changing the position of a given actuator may be indicated, for example, in such a way that the indicating signal is automatically transmitted to the safety device 5 by the control unit 9 for the parachute, an altimeter, a position sensor, another measuring or monitoring unit for monitoring the operations of the flight, or another radio transmitter connected to the present system, at a given time.

The method according to the invention may also be applied in such a way that the signals for deploying the parachute and switching off the motors are transmitted by a separate radio (separate radios), and on channels allocated for these signals, at specific frequencies.

One embodiment of the invention is the procedure in which the replacement signal is a signal transmitted from the earth and switching off the power to the motors.

The method according to the invention may also be applied in such a way that the replacement signal is transmitted from the receiver 3 past the flight controller 4 to the safety device 5 or also past the safety device directly to the speed controller or servo unit controlling the actuator. According to FIG. 2, when the replacement signal x, y', z', etc. is transmitted via the safety device 5, a signal v demonstrating a need for changing the speed of rotation or the position of an actuator is transmitted from the receiver 3 to the safety device, and the safety device will replace this signal with a replacement signal. When the replacement signal is transmitted in the above described way directly past the safety device 5, it is the second replacement signal x', y", z", etc. The second replacement signal x' is thus the second replacement signal to be transmitted to the speed controller or servo unit of a motor, and the replacement signals y", z", etc. are second replacement signals to be transmitted to other actuators (servo units).

The power source 11 used in the method may be, for example, an accumulator, a battery, or a fuel cell.

It should be noted that even though this description focuses on one kind of an implementation example advantageous for the invention, this should not be construed as in any way limiting the use of the invention merely to this type of an example, but various modifications are feasible within the scope of the inventive idea defined in the claims.

What is claimed is:

1. A method for controlling an actuator of a remote-controlled flying device, said method comprising the steps of:
   a. a flight controller supplying control signals to a safety device comprising a memory, wherein at least one of the control signals is transmitted by the safety device to a speed controller of at least one motor of the flying device, or to a servo unit controlling the speed controller;
   b. storing a replacement signal in the memory of the safety device, said replacement signal being configured to control the speed controller directly, or via the servo to stop or to reduce power transmission to the at least one motor;
   c. a control unit of a parachute transmitting a signal to the safety device simultaneously with a deployment of the parachute or transmitting a corresponding message demonstrating the deployment;
   d. upon receiving the signal or message of step c) the safety device stopping the transmission of the at least one control signal to the speed controller or to the servo unit, and starting transmission of the replacement signal to the speed controller or to the servo unit; and
   e. upon receiving the replacement signal the at least one motor is stopped, or its rotation movement is decelerated.

2. The method according to claim 1, wherein all signals of the flying device which control power to be transmitted to the motor, are replaced, or their effect of transmitting power to the motors is reduced.

3. The method according to claim 1, wherein the control unit is a separate unit, a part of the safety device or a sensor controlling deployment of the parachute.

4. The method according to claim 1, wherein a computer or an autopilot is used as the flight controller.

5. The method of claim 1, wherein in step of c) the signal is transmitted to the safety device by a radio controller.

6. A method for controlling an actuator of a remote-controlled flying device, said method comprising the steps of:
   a. a flight controller supplying control signals to a safety device comprising a memory, wherein at least one of the control signals is transmitted by the safety device to a servo unit controlling the actuator, wherein the actuator is legs, a camera rack, a camera, a stabilizing system or an electric motor of the flying device controlling maintenance of a given position;
   b. storing a replacement signal in the memory of the safety device, said replacement signal being configured to be capable of controlling the servo unit in such a way that the actuator is moved from the given position into a second position;
   c. a signal demonstrating a need for changing position of said actuator from the first position to a second position is transmitted from the flight controller to the safety device automatically or by manual operation;
   d. upon receiving signal of step c) the safety device interrupting the transmission of the at least one control signal to the servo unit of the actuator, and starting to transmit the replacement signal to the servo unit of the actuator, whereby the position of the actuator is changed to the second position.

7. The method according to claim 6, wherein a computer or an autopilot is used as the flight controller.

8. The method according to claim 6, wherein an automatic signal demonstrating need for changing the position of the actuator is transmitted from a control unit of the parachute, an altimeter, a position sensor, another measuring or monitoring unit monitoring the functions of the flight, or a radio transmitter connected to a control system controlling the actuator of a remote controlled flying device.

9. The method according to claim 8, wherein the control unit is a separate unit, a part of the safety device or a sensor controlling deployment of the parachute.

10. A method for controlling at least one actuator of a remote-controlled flying device the method comprising the steps of:
    a. a flight controller supplying control signals to a safety device comprising a memory, wherein at least one of the control signals is transmitted from the safety device to a speed controller or a servo unit of the at least one actuator, the at least one actuator being a motor, legs, a camera rack, a camera, a stabilizing system or an electric motor of the flying device, and controlling the at least one actuator to implement a given speed of rotation or to maintain a given position;
b. storing a replacement signal in the memory of the safety device, or transmitting a second replacement signal from a receiver directly to a speed controller or servo unit of the at least one actuator;
c. transmitting automatically or by manual operation a signal demonstrating a need for changing speed of rotation or position of the at least one actuator from the receiver to the safety device when the replacement signal is stored in the safety device, or a second replacement signal is transmitted from the receiver directly to the speed controller or servo unit of the at least one actuator;
d. transmitting the stored replacement signal from the safety device to the speed controller(s)/servo unit(s);
e. allowing the replacement signal transmitted in step d) or the second replacement signal transmitted in step b) to replace the at least one control signal transmitted from the safety device to a speed controller or the servo unit of the at least one actuator of the flying device, and control the speed controller of the at least one actuator to reduce the speed of rotation of the motor, or to change the position of a given actuator.

11. The method according to claim 10, wherein all signals of the flying device which control power to be transmitted to the motor, are replaced, or their effect of transmitting power to the motors is reduced.

12. The method according to claim 10, wherein a computer or an autopilot is used as the flight controller.

* * * * *